(12) United States Patent
Piotrowski

(10) Patent No.: US 7,251,697 B2
(45) Date of Patent: Jul. 31, 2007

(54) METHOD AND APPARATUS FOR STRUCTURED STREAMING OF AN XML DOCUMENT

(75) Inventor: Daniel J. Piotrowski, Edison, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 660 days.

(21) Appl. No.: 10/176,232

(22) Filed: Jun. 20, 2002

(65) Prior Publication Data

US 2003/0236903 A1   Dec. 25, 2003

(51) Int. Cl.
*G06F 15/16* (2006.01)
(52) U.S. Cl. .............. 709/231; 709/203; 709/207; 709/236; 709/246; 709/247
(58) Field of Classification Search ............ 709/231
See application file for complete search history.

(56) References Cited

U.S. PATENT DOCUMENTS

| | | | |
|---|---|---|---|
| 6,898,604 B1* | 5/2005 | Ballinger et al. | 707/101 |
| 6,901,403 B1* | 5/2005 | Bata et al. | 707/101 |
| 2001/0034748 A1 | 10/2001 | Bimson et al. | 707/530 |
| 2003/0101268 A1* | 5/2003 | Davidson et al. | 709/227 |
| 2003/0177259 A1* | 9/2003 | Wookey et al. | 709/237 |
| 2004/0004619 A1* | 1/2004 | Capin et al. | 345/473 |

FOREIGN PATENT DOCUMENTS

| | | |
|---|---|---|
| EP | 1063597 A2 | 12/2000 |
| WO | WO0046694 | 8/2000 |
| WO | WO0126373 | 4/2002 |

OTHER PUBLICATIONS

Moussa, et al. "Algorithms and programming models for efficient representation of XML for Internet." May 5, 2001. ACM Press. Proceedings of the 10th international conference on World Wide Web, pp. 366-375.*

Page, et al. "It's about time: link streams as continuous metadata." 2001. ACM Press. Proceedings of the 12th ACM conference on Hypertext and Hypermedia, pp. 93-102.*

Girardot et al., "Efficient representation and streaming of XML content over the internet medium," Multimedia and Expo, 2000. ICME 2000. 2000 IEEE International Conference on , vol. 1, No. pp. 67-70 vol. 1, 2000.*

* cited by examiner

*Primary Examiner*—Rupal Dharia
*Assistant Examiner*—Nicholas R Taylor

(57) ABSTRACT

A method and apparatus are disclosed for streaming an XML document/content in a structured manner that allows the receiver to decode prioritized portions of an XML document. Document models, such as XML Schemas, are utilized in converting XML documents into prioritized portions that are transmitted according to a predefined scheme. Thus, the present invention allows the XML receiver to begin processing the most important XML portions of an XML stream first as well as in mid-transmission and allowing a user to end the transmission before lower priority XML portions are received.

20 Claims, 3 Drawing Sheets

METHOD AND APPARATUS FOR STRUCTURED STREAMING OF AN XML DOCUMENT

FIELD OF THE INVENTION

The present invention relates to the streaming of continuous media, and more particularly, to a method and apparatus for streaming and XML document in a structured manner.

BACKGROUND OF THE INVENTION

The Extensible Markup Language (XML) is a standard for encoding textual information that has been recommended by the World Wide Web Consortium (W3C). For a discussion of the XML standard, see, for example, Extensible Markup Language (XML) 1.0 W3C Recommendation, http://www.w3.org/TR/1998/REC-xml-19980210, incorporated by reference herein. The XML standard allows XML-enabled applications to inter-operate with other compliant systems for the exchange of encoded information.

XML documents utilize several basic concepts. XML documents store textual data in a hierarchical tree structure. Each XML document has one root node, often referred to as the root element, with the other nodes in the hierarchical tree being arranged as descendants of the root node. The XML standard specifies four types of nodes, namely, character nodes, processing instruction (PI) nodes, comment nodes and element nodes. An XML-based application can store data in all the different types of nodes and in all the fields of each node type. XML also utilizes a so-called document model approach, such as Document Type Definition or "DTD", to define document attributes.

A number of applications, such as video on demand and other continuous media applications, have emerged for encoding and transmitting continuous media streams. The proposed MPEG-7 standard, for example, from the Motion Pictures Group, provides a specification for encoding video information as well as textual information related to the video source. Continuous media streams are typically transmitted using a packet-based communication system. Due to the unreliable nature of packet-based communication systems, however, the quality of the received stream may be impacted by packet loss. Thus, such continuous media transmission systems generally must include a mechanism that allows the receiver to adapt to lost packets. A number of techniques have been proposed or suggested for addressing packet loss in a continuous media transmission system, including redundant transmissions, retransmission, interleaving and forward error correction techniques. For a general discussion of such techniques for addressing packet loss in continuous media systems, see, for example, "Options for Repair of Streaming Media," Network Working Group, Request for Comments No. 2354 (June, 1998), downloadable from ftp.isi.edu/in-notes/rfc2354.txt, incorporated by reference herein.

XMLNet is an application programming interface (API) for streaming XML documents. XMLNet allows information to be transferred over the Internet or another network in real time as a series of XML documents. The XML documents are delivered to the receiver in a serial fashion. The receiver must receive an entire XML document, however, before the receiver can decode and process any of the XML content contained in the XML document. For a discussion of XMLNet, see, for example, "XMLNet," downloadable from home.earthlink.net/%7Earabbit/xmlnet (Dec. 9, 1998).

A need therefore exists for a method and apparatus that allows a user to prioritize of portions of an XML encoded document for transmission and allow a receiver to decode the portions that are received, even if other or lower priority portions of the complete XML document are not received, for example, in the event of a packet loss or before the complete XML document is received. A further need exists for a method and apparatus that permits streaming of an XML document in a prioritized manner that allows a only a portion of the XML document to be transmitted and decoded by the receiver, if so desired by a user.

SUMMARY OF THE INVENTION

Generally, a method and apparatus are disclosed for streaming an XML document/content in a structured manner that allows the receiver to decode portions of an XML document in a prioritized manner. Document models are utilized in converting XML documents into prioritized portions, elements, segments or sub-trees (hereinafter known as "XML portions") that are transmitted according to a predefined scheme. Thus, the present invention allows the XML receiver to begin processing the most important XML portions of an XML stream first as well as in mid-transmission and allowing a user to end the transmission before lower priority XML portions are received.

According to one embodiment of the invention, an XML document is segmented into XML portions according to a particular XML Schema based on a particular application (e.g. purchase orders, invoices, etc.). For example, the XML document for a purchase order for an e-commerce transaction over the Internet can be segmented into various portions, e.g., name, address, product number, price, etc. Thereafter, these portions are prioritized, based on the user's criteria. These XML portions are then grouped and or sent to a receiver to decode the most important XML portions of the XML document first. Specifically, each XML document is decomposed and encoded as a collection of XML Schema elements, which are prioritized according to a specific set of parameters (depending on the application or predefined user parameters). Each prioritized XML portion from the larger XML document is parsed and validated by the XML receiver as if it is an XML document.

According to another aspect of the invention, users may terminate the request after receiving several XML portions of the XML document or before the complete XML document is received. Thus, a user (1) can terminate further transmissions of the XML portion and can decode only the XML portions he or she determines to be important within the XML document and (2) utilize the known XML Schema to reconstruct the entire XML document, provided enough of the streamed XML portions are received, even if certain lower priority XML portions are missing.

A more complete understanding of the present invention, as well as further features and advantages of the present invention, will be obtained by reference to the following detailed description and drawings.

DETAILED DESCRIPTION

Figure 1:
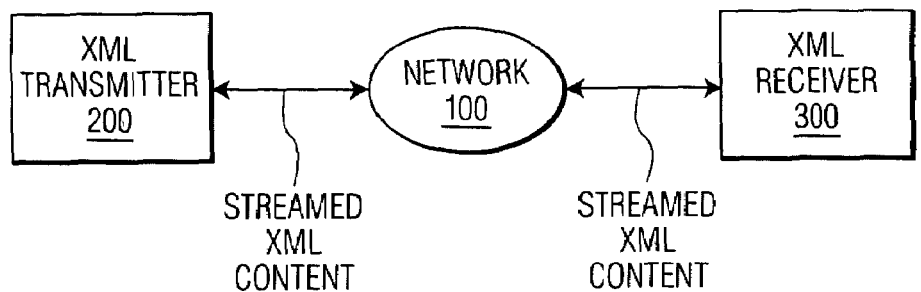
FIG. 1 illustrates a representative network environment where the present invention may operate.

FIG. 1 illustrates a network environment 100 where the present invention may operate. As shown in FIG. 1, an XML transmitter 200 transmits streamed XML documents/content to an XML receiver 300. According to a feature of the present invention, discussed further below, the XML transmitter 200 encodes and transmits the XML content in such a manner that allows the XML receiver 300 to decode only the prioritized XML portions of the transmitted XML document that are received. For example, the XML receiver 300 may decode only a portion of the streamed XML document if a user terminates further transmission or part of the XML data is subject to a packet loss or if the complete XML document has not yet arrived. Thus, in accordance with the present invention, the XML receiver 300 can intercept an XML stream in mid-transmission and still perform useful tasks based on the received XML portion of the XML encoded document. In this manner, a user defines the XML portions of XML document most relevant and may discontinue transmission once these XML portions are received.

Each XML document is encoded as a collection of segments (e.g. XML portions), which enables the receiver 300 to no longer wait to receive the entire XML document before processing the information. Sub-trees are used in accordance with the teachings of U.S. patent application Ser. No. 09/411,756 filed Apr. 10, 1999, entitled "Method and Apparatus for Streaming XML Content," assigned to the assignee of the present invention and incorporated by reference herein.

For example, an XML document is decomposed and encoded as a collection of portions/segments or so-called sub-trees. A sub-tree is mounted on a given node, and contains the given node and all nodes beneath the given node in the hierarchical tree structure. Each sub-tree in a larger XML document tree is parsed and validated by the receiver 300 as if it is an independent tree. A given sub-tree can include additional sub-trees. Each sub-tree in the streamed XML document utilizes a structure node that serves as a sub-tree wrapper function around each independent sub-tree. The structure node indicates the relationship of the sub-tree to other sub-trees. In this manner, the XML receiver 300 can reconstruct the structure of the full tree provided enough of the streamed XML content is received.

As noted above, XML utilizes a document model approach, such as Document Type Definition or "DTD". In particular, XML Schemas express shared vocabularies and provide a means for defining the structure, content and semantics of XML documents. XML Schemas are used to define a class of XML documents or streams of bytes sent between applications, as fields in a database record, or as collections of XML information items. These models are typically provided in advance but can be arbitrarily created as needed as well. XML uses the DTD or other structured document models to associate the content with the appropriate mark up commands to enable the content to be displayed with a desired presentation and style. The mark up language adds identifiers for each of the "elements" or parts of the document for identification purposes. For instance, a DTD may define a document model as having a title, a main paragraph and several secondary paragraphs. The mark up language then adds identifiers, called a "tag", to designate the beginning and the end of a particular element.

In accordance with one embodiment, known XML Schemas are modified and used to define the priority of the XML portions. For example, a user pre-defines in an XML Schema, when it is created, which portions thereof have the highest priority. Moreover, a user may modify the priorities of the XML Schemas via any of a number of conventional methods, such as in the request message for a particular XML document.

The DTD may also be modified to allow parts of the DTDs (DTD segments) to be present with the XML portions. The DTD segments are used in accordance with the present invention to verify the validity and may also define the priority of the XML portions. Alternatively, the DTD segments if not included in the individual XML portions, may be provided by a reference and included in the full DTD, which is given the highest priority.

Figure 2:
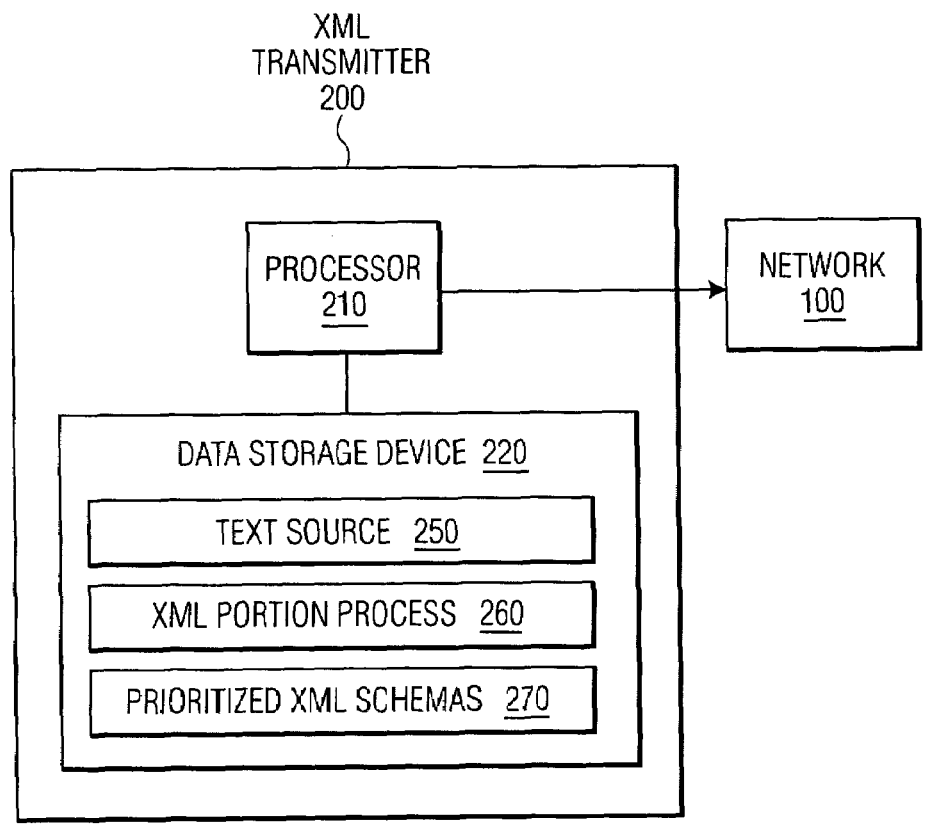
FIG. 2 is a block diagram showing the architecture of an illustrative XML transmitter in accordance with the present invention.

FIG. 2 is a block diagram showing the architecture of an illustrative XML transmitter 200 in accordance with the present invention. The XML transmitter 200 may be embodied as a general purpose computing system, such as the general purpose computing system shown in FIG. 2. As shown in FIG. 2, the XML transmitter 200 preferably includes a processor 210 and related memory, such as a data storage device 220, which may be distributed or local. The processor 210 may be embodied as a single processor, or a number of local or distributed processors operating in parallel. The data storage device 220 and/or a read only memory, (ROM) (not shown) are operable to store one or more instructions, which the processor 210 is operable to retrieve, interpret and execute.

The data storage device 220 includes a text source 250 that may be retrieved from memory or generated in real-time. Thus, the text source 250 may be a pre-recorded textual file, such as a database or another document, or a document generated in real-time, for example, by a user entering textual information from a keyboard (not shown) or by a speech recognition system (not shown). The data storage device 220 also includes one or more XML portion process 260 and prioritized XML Schemas (or prioritized DTD information) 270 that indicates how the textual information should be decomposed in constructing the XML portions. For example, the XML portion process 260 uses the sub-tree method described above along with XML Schemas 270 to determine how the XML document will be decomposed. Other conventional segmenting processes may also be used provided however they can be modified to be used in conjunction with the XML Schemas and the user established priorities. As explained above, the XML Schemas 270 include the user defined priorities as to each XML portion. Importantly, each "element" as defined by the DTD or XML Schema is assigned a priority by a user. XML Schemas 270 may be included in the XML portion process 260 or may be called upon by processor 210 to help determine the XML portions. Thus, the XML transmitter 200 will process the text source 250 using the identified XML portion process 260 to generate the transmitted content (e.g. XML portions) in a streamed XML format.

Figure 3:
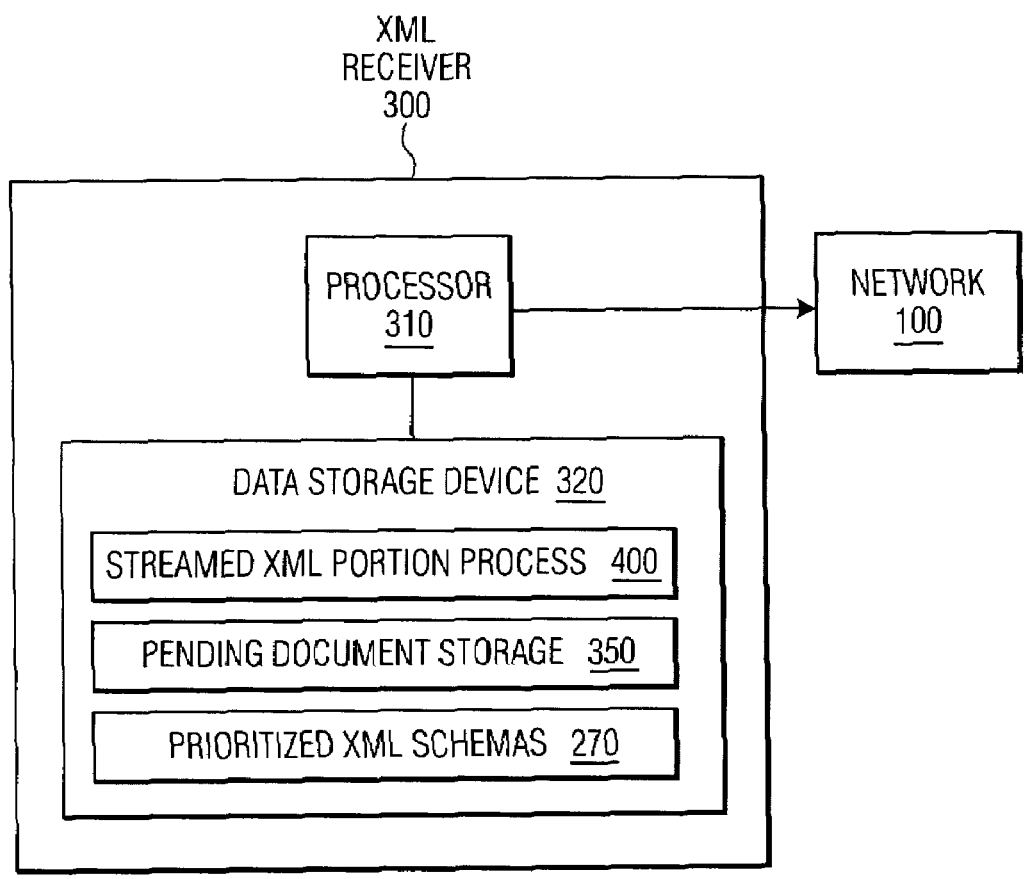
FIG. 3 is a block diagram showing the architecture of an illustrative XML receiver in accordance with the present invention.

FIG. 3 is a block diagram showing the architecture of an illustrative XML receiver 300 in accordance with the present invention. The XML receiver 300 may be embodied as a general purpose computing system, such as the general purpose computing system shown in FIG. 3, or the XML receiver 300 may be integrated with another device, such as a digital television (DTV). The XML receiver 300 includes certain standard hardware, such as processor 310 and related memory, such as a data storage device 320, as discussed above in conjunction with the XML transmitter 200.

The data storage device 320 includes a streamed XML portion process 400 and the prioritized XML Schemas (or prioritized DTD information) 270, discussed below in conjunction with FIG. 4. Generally, the streamed XML portion process 400 processes each XML portion that is received from the XML transmitter 200, even if other XML portions of the larger XML document are not received.

Figure 4:
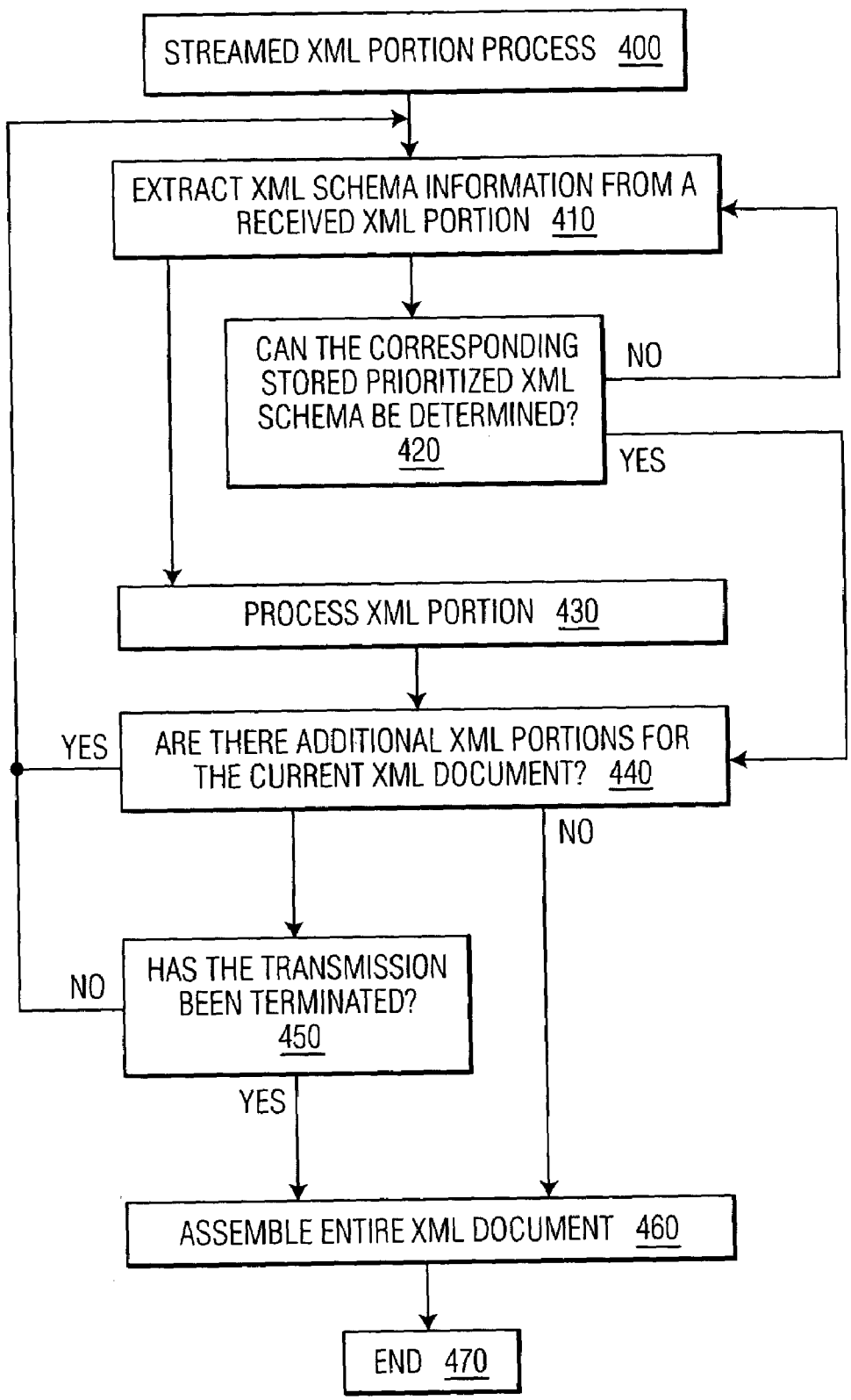
FIG. 4 is a flow chart describing an exemplary streamed XML portion process executed by the XML receiver of FIG. 3.

FIG. 4 is a flow chart describing an exemplary streaming XML portion process 400 executed by the XML receiver 300 of FIG. 3. The streaming XML portion process 400 in steps 410 and 420 extracts the structure (e.g. DTD or XML Schema) information received in an XML portion and determines the corresponding stored prioritized XML Schema 360 in XML receiver 300. This process repeat until the particular prioritized XML Schema is determined. In step 430, the received XML portion is processed directly, for example, by displaying the content or storing the content in a specified location. Thereafter, a test is performed during step 440 to determine if additional XML portions have been received that are associated with the current XML document. If it is determined, using the determined prioritized XML Schema, during step 420 that there are additional XML portions in the current XML document to be processed, then program control returns to step 410 and continues processing the next XML portion in the manner described above. A further determination is made whether the transmission has been terminated, for example, by the user in step 450, via a termination message or other conventional method. Also, termination may be involuntary, such as transmission errors/failure due to noise, other inference or network congestion. If it is determined that there are no additional XML portions to be processed in the current XML document being constructed or the transmission has been terminated, then the full XML document can be assembled, if possible, during step 460. Thereafter, program control terminates during step 470 until additional XML portions are received for processing.

It is to be understood that the embodiments and variations shown and described herein are merely illustrative of the principles of this invention and that various modifications may be implemented by those skilled in the art without departing from the scope and spirit of the invention.

What is claimed is:

1. A method of transmitting XML documents, comprising the steps of:
   generating XML portions of the XML document for transmitting, wherein each of the XML portions includes structure information to define the XML portion's relationship to other XML portions in the XML document;
   prioritizing the XML portions according to a predetermined scheme, wherein each predetermined scheme is dependent upon a specific application and user defined priorities; and
   transmitting the XML prioritized portions, wherein said prioritizing of the XML portions allows for decoding higher priority transmitted XML portions even if lower priority portions are not received.

2. The method of claim 1, wherein said predetermined scheme is in accordance with a specified XML Schema document, wherein each XML Schema element is prioritized.

3. The method of claim 2, wherein the step of prioritizing the XML portions includes adding an XML Schema identifier.

4. The method of claim 1, further including the step of a user terminating the transmitting step after a first XML portion is transmitted.

5. A method of encoding an XML document comprising the steps of:
   decomposing the XML document into a plurality of XML portions according to a predefined prioritized manner, wherein each predefined manner is dependent upon an specific application and user defined priorities, wherein each of the XML portions includes structure information to define the XML portion's relationship to other XML portions in the XML document; and independently transmitting each of the XML portions with information indicating how the XML document is positioned within the larger XML document, wherein said prioritizing of the XML portions allows for decoding higher priority transmitted XML portions even if lower priority portions are not received.

6. The method of claim 5, wherein the information indicating how the XML portions are positioned within the larger XML document is transmitted in one XML portion.

7. A method for receiving a streamed XML document, the XML document including a plurality of XML portions, wherein each of the XML portions includes structure information based on a specific application and user defined priorities to define the XML portion's relationship to other XML portions in the XML document, said method comprising the steps of:
   extracting from at least one received XML portion predetermined structure information or portion thereof, wherein the predetermined structure information is used to prioritize the XML portions, wherein said prioritizing of the XML portions allows for decoding higher priority transmitted XML portions even if lower priority portions are not received;
   processing the XML portions directly; and
   recompiling the XML document from the received XML portions and structure information.

8. The method of claim 7, wherein the processing step further comprises the step of displaying the information.

9. The method of claim 7, wherein the processing step further comprises the step of storing the information.

10. The method of claim 7, further comprising the step of terminating further reception of XML portions after a first XML portion is received.

11. The method of claim 7, further comprising the step of continuing to process subsequent XML portions even if one of the XML portions is not properly received.

12. An XML transmitter (200) comprising:
   a memory (220) for storing an XML document and computer readable code; and
   a processor (210) operatively coupled to said memory, said processor configured to:
      generate portions of the XML document for transmitting, wherein the portions are prioritized according to a predetermined scheme, wherein each each predetermined scheme is dependent upon a specific application and user defined priorities and each of the XML portions includes structure information to define the XML portion's relationship to other XML portions in the XML document; and
      transmit the prioritized portions according to their respective priority, wherein said prioritizing of the XML portions allows for decoding higher priority transmitted XML portions even if lower priority portions are not received.

13. The XML transmitter (200) of claim 12, wherein the predetermined scheme is in accordance with a specified XML Schema document, wherein each XML Schema element is prioritized.

14. The XML transmitter (200) of claim 13, wherein the prioritized portions include an XML Schema identifier.

15. The XML transmitter (200) of claim 12, wherein the processor is operable to allow a user to terminate the transmitting of the prioritized portions after at least a first prioritized portion is transmitted.

16. An XML transmitter (200) comprising:
a memory (220) for storing an XML document and computer readable code; and
a processor (210) operatively coupled to said memory, said processor configured to:
decompose the XML document into a plurality of XML portions according to a predefined prioritized manner, wherein each of the XML portions includes structure information to define the XML portion's relationship to other XML portions in the XML document and is based on a specific application and user defined priorities; and
independently transmit each of the XML portions with information indicating how the XML portion is positioned within the larger XML document, wherein said prioritizing of the XML portions allows for decoding higher priority transmitted XML portions even if lower priority portions are not received.

17. An XML receiver(300) for receiving a streamed XML document, said XML document including a plurality of XML portions, wherein each of the XML portions includes structure information to define the XML portion's relationship to other XML portions in the XML document and is based on a specific application and user defined priorities, comprising:
a memory (320) for storing computer readable code; and
a processor (310) operatively coupled to the memory, said processor configured to:
extract from at least received XML portion predetermined structure information or portion thereof, wherein the predetermined structure information is used to prioritize the XML portions, wherein said prioritizing of the XML portions allows for decoding higher priority transmitted XML portions even if lower priority portions are not received;
process the XML portion directly; and
recompile the XML document from the received XML portions and structure information.

18. The XML receiver (300) of claim 17, wherein the processor is operable to allow a user to terminate further transmission of the XML portions after at least a first XML portion is transmitted.

19. The XML receiver (300) of claim 17, wherein the predetermined structure information is in accordance with a specified XML Schema document, wherein each XML Schema element is prioritized.

20. The XML receiver (300) of claim 19, wherein the received XML portions include an XML Schema identifier.

* * * * *